US007426106B2

(12) United States Patent
Nakagawa et al.

(10) Patent No.: US 7,426,106 B2
(45) Date of Patent: Sep. 16, 2008

(54) LIQUID CRYSTAL DISPLAY DEVICE

(75) Inventors: Taiji Nakagawa, Tottori (JP); Seiji Morimoto, Tottori (JP); Junya Mita, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 0 days.

(21) Appl. No.: 10/942,085

(22) Filed: Sep. 16, 2004

(65) Prior Publication Data

US 2005/0088809 A1   Apr. 28, 2005

(30) Foreign Application Priority Data

Sep. 26, 2003   (JP)   ............... 2003-336078

(51) Int. Cl.
*H05K 5/00*   (2006.01)
(52) U.S. Cl. ............... 361/681; 349/58; 361/682
(58) Field of Classification Search ............... 361/681, 361/682; 349/60, 58
See application file for complete search history.

(56) References Cited

U.S. PATENT DOCUMENTS

| | | | | |
|---|---|---|---|---|
| 5,986,726 A * | 11/1999 | Murai | ............... | 349/59 |
| 6,055,029 A | 4/2000 | Kurihara et al. | | |
| 6,362,860 B1 * | 3/2002 | Sagawa | ............... | 349/59 |
| 6,392,724 B2 * | 5/2002 | An et al. | ............... | 349/58 |
| 6,734,927 B2 * | 5/2004 | Sato | ............... | 349/58 |
| 6,771,335 B2 * | 8/2004 | Kimura et al. | ............... | 349/112 |
| 6,828,721 B2 * | 12/2004 | Wakita | ............... | 313/491 |
| 6,867,825 B2 * | 3/2005 | Kanatsu et al. | ............... | 349/60 |
| 6,870,582 B2 * | 3/2005 | Hayashimoto et al. | ............... | 349/58 |
| 6,902,300 B2 * | 6/2005 | Lee | ............... | 362/306 |
| 6,919,938 B2 * | 7/2005 | Choi et al. | ............... | 349/58 |
| 6,933,990 B2 * | 8/2005 | Park | ............... | 349/59 |
| 7,139,047 B2 * | 11/2006 | Park | ............... | 349/58 |
| 7,235,922 B2 * | 6/2007 | Jun et al. | ............... | 313/582 |

(Continued)

FOREIGN PATENT DOCUMENTS

EP   0 851 713 A2   7/1998

(Continued)

OTHER PUBLICATIONS

Patent Abstracts of Japan for JP 2002-190209, published Jul. 5, 2002.

(Continued)

*Primary Examiner*—Lisa Lea-Edmonds
*Assistant Examiner*—Ingrid Wright
(74) *Attorney, Agent, or Firm*—Katten Muchin Rosenman LLP

(57) ABSTRACT

In a liquid crystal display device provided with a backlight unit, creak reduction means is provided at least on one part of the areas where members constituting the liquid crystal display device such as the liquid crystal panel, the diffusion plate, the reinforcing plate, the frame of the liquid crystal display device and the back surface reflector for the backlight unit come into contact with each other. The creak reduction means may be a slippery film whose surface is fluorinated such as a fluororesin film, a polyacetal resin film, a polyethylene film, and a silicon coating film, or protrusions or protruding fins, or a friction reduction means such as silicon oil or fluorine oil, or a mutual displacement absorbing means such as a flexible sheet.

3 Claims, 7 Drawing Sheets

U.S. PATENT DOCUMENTS

| | | |
|---|---|---|
| 2001/0024248 A1 | 9/2001 | Kim |
| 2002/0044437 A1 | 4/2002 | Lee |
| 2002/0154245 A1* | 10/2002 | Kitamura .................... 348/465 |
| 2006/0055839 A1* | 3/2006 | Hirao et al. .................... 349/58 |

FOREIGN PATENT DOCUMENTS

| | | |
|---|---|---|
| EP | 0 851 713 A3 | 2/1999 |
| JP | 2001-209327 | 8/2001 |
| JP | 2001-249332 A | 9/2001 |
| JP | 2002-190209 A | 7/2002 |

OTHER PUBLICATIONS

Patent Abstracts of Japan for JP 2001-249332, published Sep. 14, 2001.

Patent Abstracts of Japan for JP 2000-214457, published Aug. 4, 2000.

Patent Abstracts of Japan, vol. 2003, No. 1, Jan. 14, 2003, for JP 2002 279820 A.

* cited by examiner

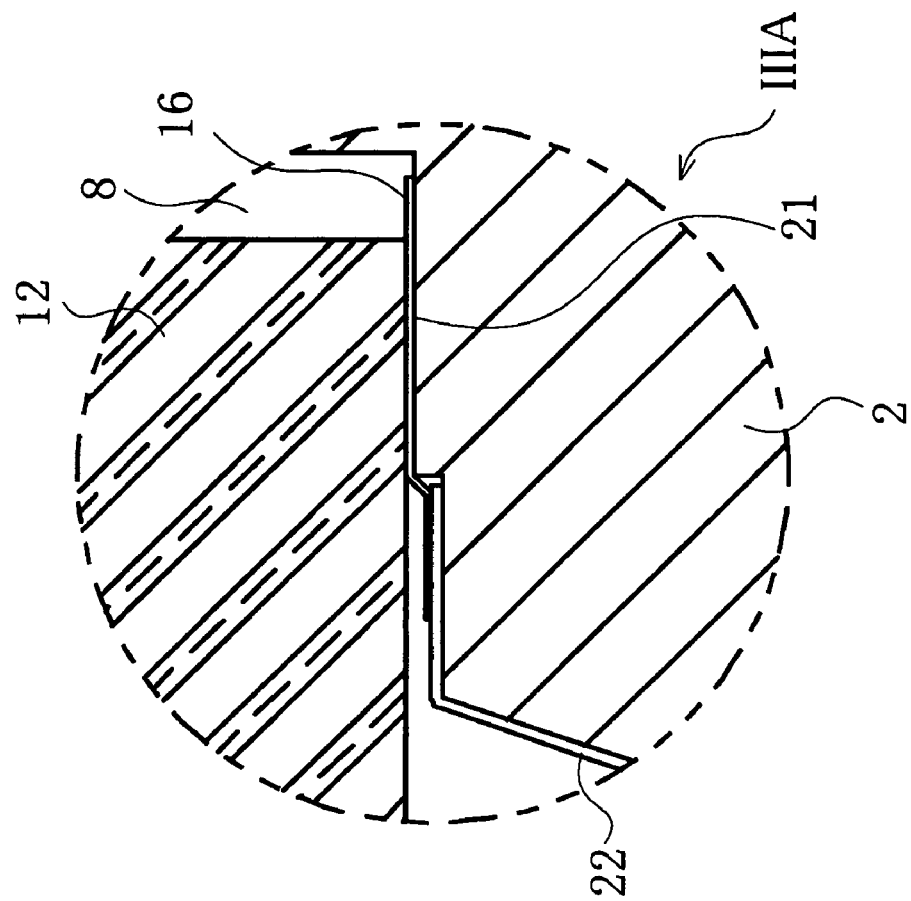
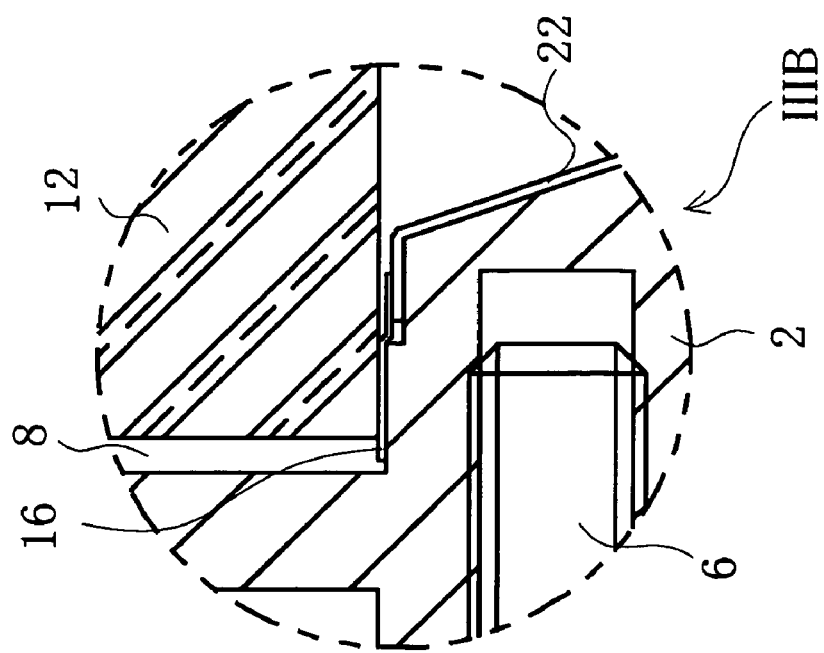

LIQUID CRYSTAL DISPLAY DEVICE

BACKGROUND OF THE INVENTION

1. Field of the Invention

The present invention relates to the management of noise in a large-sized liquid crystal display device, particularly to a liquid crystal display device in which the generation of noise due to friction occurring between members of the liquid crystal display device caused by thermal expansion after activation thereof, such as the liquid crystal panel, diffusion plate and reinforcing plate for a backlight unit, and frame, is prevented.

2. Description of the Related Art

Recently manufactured liquid crystal display devices have become larger in size, where the diagonal dimension of the screen generally ranges from 20 inches to 30 inches. Likewise, liquid crystal display devices with screens even exceeding a diagonal dimension of 40 inches have been developed and used to produce large-sized television sets, video display devices, or display devices of workstations and CAD devices. Such large-sized liquid crystal display devices also require the quality of brightness of display devices which employ cathode ray tubes.

Since such liquid crystal display devices are usually placed on a desk or floor, or such similar stationary location, they do not have to be as thin as laptop personal computers, but must be of such appropriate thinness to fully exploit their characteristic features. Therefore, in many cases, a transmissive type of liquid crystal panel has been developed for which a direct type backlight structure has been adopted.

In the direct type backlight structure, several tubular light sources such as cold-cathode tubes are arranged in a parallel manner on the rear surface of the liquid crystal panel without using a light guiding plate, and serve to direct light to the liquid crystal panel. A reflector is arranged on the back surface of the backlight structure, while a diffusion plate is arranged on an output surface to diffuse the light emanating from the light sources, and thereby effect uniform light emission. The tubular light sources are held by a frame, in such manner that the frame mechanically affixes and supports both ends of the light sources to be electrically connected. Most of the power consumed by a liquid crystal display device comes from the backlight, which is also mainly responsible for the heat generated by the device. The quantity of power consumed and heat generated increases in relation to the number of tubular light sources employed for the backlight structure, which is associated with the enlargement of the liquid crystal display device.

Meanwhile, in the large-sized liquid crystal display devices, the backlight unit is made in the shape of a box in which a metal frame and a back surface reflector are usually combined with resin members. Optical members of the liquid crystal display device, such as the diffusion plate and the liquid crystal panel, which are made of various materials such as plastic and glass, are arranged in front of the backlight unit. However, the quality of materials differs, such that some are thin while some are thick in order to obtain necessary strength. Consequently, optical members of the liquid crystal display device, such as the diffusion plate and the supporting frame largely differ in thermal expansion coefficient and this poses a problem because when the liquid crystal display device is activated by turning the backlight source ON and heat is generated, the various members rub against each other and the frame and noise associated with the friction occurs. This problem posed by differences in thermal expansion causing friction between the frame and various members of the liquid crystal display device also occurs when the device is deactivated, and noise generated by the friction continues for a while. These points are described in detail with the aid of FIG. 9 showing an exploded perspective view of a conventional liquid crystal display device.

A liquid crystal display device 80 consists of a liquid crystal panel 83, a bezel cover 84, and a direct type backlight unit 82. In the backlight unit 82, a diffusion plate 87 is sandwiched and fixed between a picture-frame-shaped area 89 arranged on the top end of a frame 88 and a plurality of tubular light sources 85 supported by a light source supporting member 86. The back surface of the tubular light sources 85 is covered by a metal reflector 90.

The top end portion of the backlight unit 82, that is, the area upon which the liquid crystal panel 83 is placed is the picture-frame-shaped area 89 of the frame 88. The liquid crystal panel 83 is usually made of glass, and cannot be directly placed on the frame 88. Therefore, rubber or the like is adhered to that part of the area of the frame 88, with which the liquid crystal panel 83 comes into contact, and used as cushion.

Further, to align the liquid crystal panel 83 with the backlight unit 82, it is necessary to provide alignment portions to be applied to the end surface of the liquid crystal panel 83 on the top end portion thereof, and the alignment portions are separately provided by plastic. Friction occurs between the frame, the cushion, and the material applied and the liquid crystal panel due to differences in thermal expansion coefficient after the liquid crystal display device is activated, giving rise to creaks. Furthermore, in some of the conventional liquid crystal display devices, the diffusion plate is disposed so as to cover the frame opening of the backlight unit and the picture-frame-shaped frame for fixing the diffusion plate is laid thereon, or a plate-shaped frame is assembled and the diffusion plate is attached to the frame. In this case, creaks also occur when friction between the diffusion plate and the frame takes place as described above.

In the case of the large-sized liquid crystal display device in particular, the heat generated by the backlight after the device is activated is greater owing to the larger size of the liquid crystal panel and the diffusion plate, and therefore the differences in thermal expansion between various members and the frame are consequently enhanced, leading to a greater creak arising from the friction. After the liquid crystal display device is activated, the creak can last for about two hours and therefore, needs to be reduced.

SUMMARY OF THE INVENTION

In the course of their various studies to address the above-described problems, the inventors of the present invention focused attention on the fact that the noise arising after activation or deactivation of the device was caused by the differences in thermal expansion coefficient between those of the liquid crystal panel or the reinforcing plate for the backlight unit and various members, such as the frame of the liquid crystal display device. Then the inventors discovered that the noise can be eliminated by reducing the incidence of friction between the members which come into contact with each other or absorb mutual displacement, and achieved the present invention.

Specifically, the present invention refers in particular to the management of noise caused by mutual friction due to the thermal expansion of various members of a large sized liquid crystal display device using the direct type backlight unit, such as the liquid crystal panel, the diffusion plate, the reinforcing plate, the frame, and the reflector for the backlight unit, after activating the liquid crystal display device.

The present invention is characterized in that the liquid crystal display device includes a liquid crystal panel and a backlight unit, in which creak reduction means is provided at least on one part of the areas where members constituting the liquid crystal display device come into contact with each other.

Further, the present invention is characterized in that the creak reduction means is provided at least on one part of areas where members constituting the backlight unit come into contact with each other. In this case, the backlight unit is provided with light sources, a frame housing the light sources, and an optical sheet, which is made to reside above the light sources and supported by a step formed on the frame, and the creak reduction means may be provided at the areas where the frame and the optical sheet come into contact with each other. Further, the backlight unit is provided with spacer pins supporting the optical sheet, and the creak reduction means may be provided at the areas where the optical sheet and the spacer pins come into contact with each other. Further, the backlight unit is provided with a reflector equipped with reinforcing members on the back surface thereof, and the creak reduction means may be provided between the reflector and the reinforcing members.

Furthermore, the backlight unit is provided with light sources appropriately housed by means of a frame, an optical sheet arranged above the light sources, and a reinforcing plate which is arranged above the light sources and supported by the step formed on the frame, and the creak reduction means may be provided at the areas where the frame and the reinforcing plate come into contact with each other. Further, the backlight unit is provided with spacer pins supporting the reinforcing plate, and the creak reduction means may be provided at the areas where the optical sheet and the spacer pins come into contact with each other. Further, the backlight unit is further provided with the reflector equipped with reinforcing members on the back surface thereof, and the creak reduction means may be provided between the reflector and the reinforcing members.

Moreover, the present invention is characterized in that the creak reduction means also serves as friction reduction means or mutual displacement absorbing means. In this case, the friction reduction means may be a slippery film such as a fluororesin film whose surface is fluorinated, a polyacetal resin film, a polyethylene film, and a silicon coating film, or protrusions or protruding fins, or alternatively silicon oil or fluorine oil.

Further, the mutual displacement absorbing means may be sheet metal selected from aluminum and copper, or an insulative elastic sheet.

By including the above described constitutions, the present invention produces the following superior effects.

Specifically, according to the present invention, in the large-sized liquid crystal display device provided with a backlight unit, by disposing the creak reduction means at the areas where members constituting the liquid crystal display device come into contact with each other, the noise causing friction which ensues between members of the liquid crystal display device due to differences in thermal expansion coefficient after activation thereof, is prevented, making the elimination of unpleasant creaks possible.

Further, according to the present invention, in the large-sized liquid crystal display device, by providing the friction reduction means in the backlight unit with light sources that produce heat, the incidence of friction is effectively prevented so as to eliminate noise, making the backlight more suitable for use in the large-sized liquid crystal display device.

Furthermore, according to the present invention, since the slippery film, the protrusions or protruding fins, the silicon oil or the fluorine oil, or the flexible sheet can be used as the creak reduction means, it is possible to obtain an inexpensive liquid crystal display device where friction noise is not unnecessarily generated.

BRIEF DESCRIPTION OF THE DRAWINGS

FIG. 3A is an enlarged view of the area marked as IIIA in FIG. 2A, and FIG. 3B is an enlarged view of the area marked as IIIB in FIG. 2B.

THE PREFERRED EMBODIMENTS OF THE INVENTION

Specific examples of the liquid crystal display device of the present invention will be described hereafter with reference to the drawings.

First Embodiment

Figure 1:
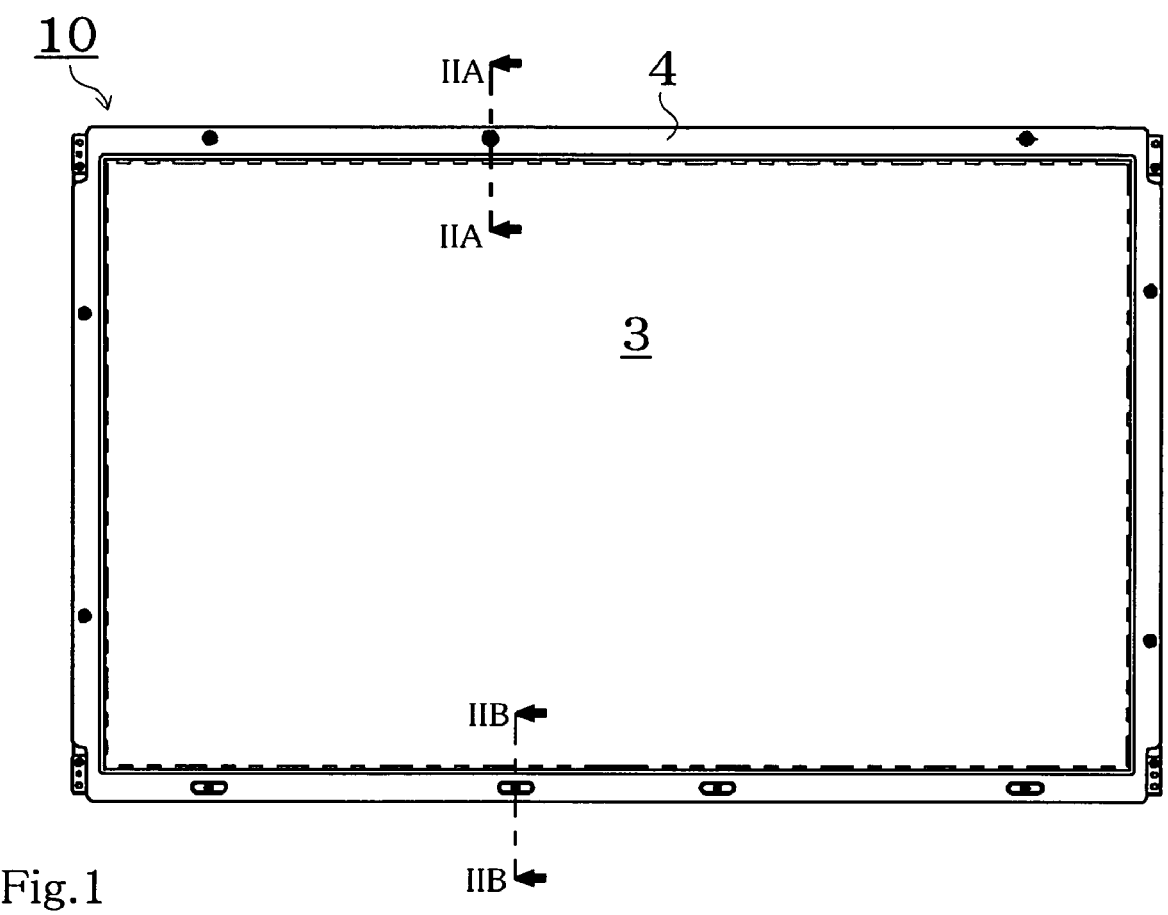
FIG. 1 is a plane view of the liquid crystal display device according to the first embodiment of the present invention.
Figure 2B:
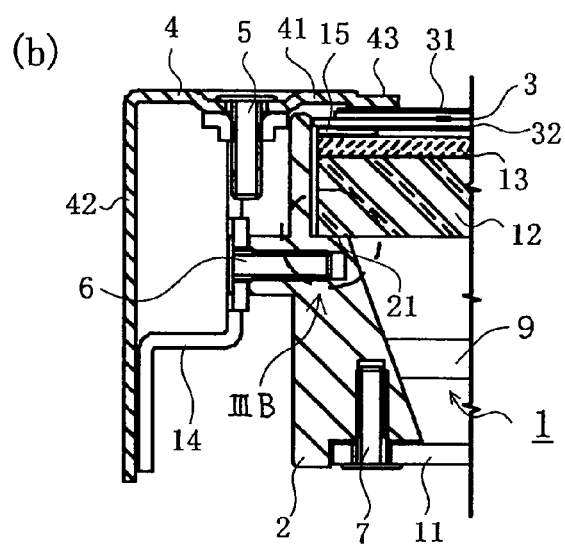
FIG. 2B is an enlarged sectional view at IIB-IIB of the liquid crystal display device referred to in FIG. 1.
Figure 2A:
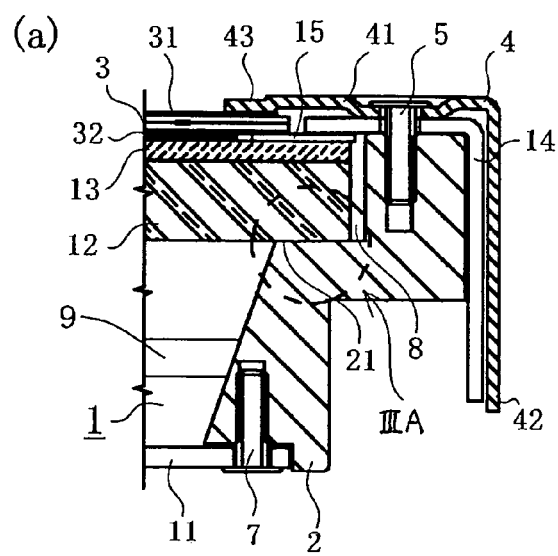
FIG. 2A is an enlarged sectional view at IIA-IIA of the liquid crystal display device referred to in FIG. 1.
Figure 4:
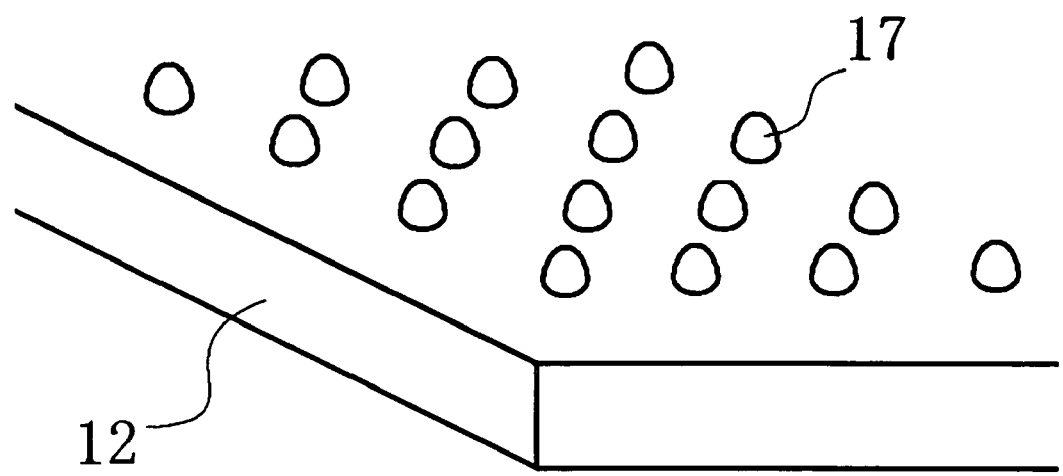
FIG. 4 is a perspective view of another example of friction reduction means referred to in the first embodiment.
Figure 5:
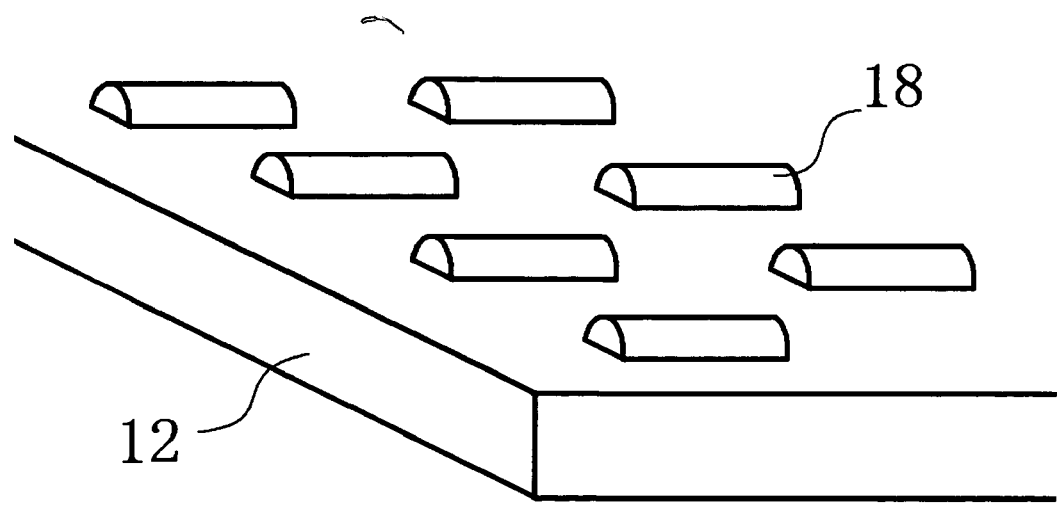
FIG. 5 is a perspective view showing still another example of the friction reduction means referred to in the first embodiment.

FIG. 1 is the plane view of the liquid crystal display device according to the first embodiment of the present invention. FIG. 2A is the enlarged sectional view at IIA-IIA of the liquid crystal display device referred to in FIG. 1, and FIG. 2B is the enlarged sectional view at IIB-IIB of the liquid crystal display device likewise referred to in FIG. 1. Further, FIG. 3A is the enlarged view of the area marked as IIIA in FIG. 2A, and FIG. 3B is the enlarged view of the area marked as IIIB in FIG. 2B. FIG. 4 is the perspective view showing another example of the friction reduction means in the first embodiment of the present invention, and FIG. 5 is the perspective view showing still another example of the friction reduction means in the first embodiment.

As shown in FIGS. 1 to 3, a liquid crystal display device 10 of the first embodiment consists of a liquid crystal panel 3, a bezel cover 4, and a direct type backlight unit 1, the rectangular and flat liquid crystal panel 3 being supported between the frame-shaped bezel cover 4 and a support portion 21 provided on a frame 2 for the backlight unit 1 by interposing a diffusion plate 13 and a reinforcing plate 12. To facilitate explanation, the display surface of the liquid crystal display device and the surface from which backlight is output are hereinafter illustrated from the upper side thereof.

The bezel cover 4 is a circular frame body in the shape of a picture frame that has a rectangular opening corresponding to the image display region of the liquid crystal panel 3 and surrounds the periphery of the image display region, and has a top horizontal wall 41 and vertical wall 42 extending downward from the periphery of the horizontal wall 41. An inner end edge portion 43 that presses the peripheral edge of the liquid crystal panel 3 from above is formed inside the horizontal wall 41.

In the liquid crystal panel 3, a liquid crystal layer is sealed between two glass substrates, and polarizers 31, 32 are arranged on the upper and lower surfaces of the liquid crystal panel 3. The peripheral edge outside the image display region of the liquid crystal panel 3 is provided with a section connecting to an external drive input section. The liquid crystal panel 3 is fixed by means of the diffusion plate 13 provided on the reinforcing plate 12, while the bezel cover 4 and the frame 2 for the backlight unit 1 are connected by bolts 5, 6, and the liquid crystal panel 3 is supported by the frame 2 which sandwiches the periphery of the liquid crystal panel 3.

The backlight unit 1 outputs light to illuminate the image display region of the liquid crystal panel 3. Tubular light sources 9 such as cold-cathode tubes that serve as light sources are arranged in plural numbers in a box-shaped space formed by the frame 2 and a back surface reflector 11, and light source supporting members that mechanically fix and support both ends of the tubular light sources 9 to realize electrical connection are provided for. Further, the backlight unit 1 includes a reflector 22 (refer to FIGS. 3A and 3B) arranged on the box-shaped inner surface thereof, the reinforcing plate 12 and the diffusion plate 13 which are arranged on the output surface of the tubular light sources 9 which corresponds to the opening of the box-shaped space. The reinforcing plate 12 serves to reinforce the liquid crystal panel 3 and the diffusion plate 12 to prevent them from being bent due to their own weight or vibration. The diffusion plate is made of a transparent material, and is very useful particularly in allowing the large-sized liquid crystal display device to carry out stable display.

In the present embodiment, acrylic resin is used to form the reinforcing plate 12 because it is completely superior to glass or the like in matters of quality of transparency, cost, workability, weight, and the like although its heat expansion coefficient is high. It is deemed excellent as material because the reinforcing plate 12 must also be larger to conform to a larger liquid crystal display device. The diffusion plate 13 serves to diffuse the light from the tubular light sources and thereby effect uniform light emission. Although the drawing shows only one plate, a plurality of diffusion plates may be used. Further, although not shown, a prism sheet may also be arranged. In any case, the backlight unit 1 includes the optical sheet such as the diffusion plate and the prism sheet.

The back surface reflector 11 forming the back surface of the backlight unit 1 is attached to the frame 2 by bolts 7.

The frame 2 is formed as a frame whose entire body slightly widens upward. In the example shown in the drawings, a step formed as a rectangular circular shelf is provided so as to surround the vicinity of the upper opening of the frame, and is used as the support portion 21 for the liquid crystal panel, the reinforcing plate 12, and the diffusion plate 13. The reinforcing plate 12 and the diffusion plate 13 are arranged in a superposed manner so as to cover the opening of the frame 2, and their periphery is supported by the support portion 21 of the frame 2 for the liquid crystal panel. The upper periphery of the diffusion plate 13 is pressed by a panel holder 14 by means of the attached bezel cover 4, and the reinforcing plate 12 and the diffusion plate 13 are thereby firmly held. A cushion material 15 is inserted between the reinforcing plate 12 and the panel holder 14. Gap 8 is provided between the end surface of the reinforcing plate 12 and the inner surface of the opening of the frame 2 so as to absorb the thermal expansion of the reinforcing plate 12. In the opening of the frame 2, the inner diameter of the shelf of the support portion 21 for the liquid crystal panel is substantially of the same shape and dimensions as those of the opening of the bezel cover 4.

In the liquid crystal display device constituted in the manner described above and equipped with the direct type of backlight with a plurality of tubular light sources, the friction reduction means serving as the creak reduction means is provided at the areas where the reinforcing plate 12 for the backlight unit 1, which is arranged on the back surface of the liquid crystal panel 3, comes into contact with the support portion 21 of the frame 2. As shown in FIGS. 3A and 3B, which represent enlarged views of the areas marked as IIIA of FIG. 2A and IIIB of FIG. 2B respectively, a slippery sheet 16 made of fluororesin film (manufactured by SUMITOMO 3M Limited under the product name "Ultra tape", for example) is adhered to the frame 2 at the areas where the support portion 21 of the frame 2 for the liquid crystal panel (reinforcing plate) comes into contact with the reinforcing plate 12. The slippery sheet 16 may be adhered to the peripheral area of the reinforcing plate 12, which contacts the support portion 21.

When such creak reduction means is provided, it is possible to prevent friction noise from being generated especially after activating the large-sized liquid crystal display device due to differences in thermal expansion between the reinforcing plate 12 and the frame 2, which are directly heated with the heat generated by turning on the direct type backlight unit. Specifically, when the slippery sheet 16 is attached as creak reduction means, the difference in thermal expansion between the reinforcing plate 12 and the frame 2 is absorbed by the smooth movement of the reinforcing plate 12, thereby eliminating friction noise.

In this connection, because the reinforcing plate 12 is much thicker than the diffusion plate 13, it has to be made thicker in order to secure its strength as the liquid crystal display device becomes larger, in which case, it easily generates noise when it comes into contact with the support portion 21 of the frame 2 while being firmly held by the panel holder 14 due to expansion by heat. For this reason, therefore, it is particularly effective to provide the creak reduction means at the areas where the support portion 21 of the frame 2 comes into contact with the reinforcing plate 12 in order to prevent the generation of noise.

Note that a slippery sheet may serve as the friction reduction means, such as a film having a low friction coefficient or a film with a fluorinated surface, polyacetal resin (POM), polyethylene film, or silicon coating film, for example, can be used other than fluororesin film.

Further, the friction reduction means may consist of protrusions 17 as shown in FIG. 4 or protruding fins 18 shown in FIG. 5 provided at the areas where the liquid crystal panel or the reinforcing plate 12 provided on the back surface of the liquid crystal panel comes into contact with the support portion 21 of the frame 2 for the backlight unit 1. In the case of the protruding fins 18, they are arrayed in an axial line along an approximated expansional direction. When the protrusions 17 or the protruding fins 18 are formed on the contact surface, there is a reduction in the number of areas of mutual contact which translates to friction reduction, and consequently noise reduction. Note that the provision for protrusions 17 may be combined with the provision for the protruding fins 18 as may be needed. Further, providing such friction reduction means is not limited to the reinforcing plate 12, as the protrusions 17 or the protruding fins 18 may also be provided on the frame 2. Providing the protrusions 17 or the protruding fins 18 on the support portion 21 or the like of the frame 2 is relatively easy because a mold for forming the frame 2 can be easily processed.

Moreover, a lubricant such as silicon oil or fluorine oil can be used as another type of friction reduction means, which may be applied in the areas where it is needed.

Although provision for the friction reduction means has been made with respect to the contact surface between the reinforcing plate 12 and the frame 2 as an example, it goes without saying that when the liquid crystal panel is placed on top of the end surface of the frame directly or by interposing the optical sheet structurally, the principle of the present invention also applies with respect to the contact areas between them. In this case, the friction reduction means may also be provided for any one of the liquid crystal panel 3, the optical sheet, and the liquid crystal panel support portion of the frame 2.

Furthermore, the friction reduction means may be provided not only at the areas where the diffusion plate 13 or the reinforcing plate 12 for the backlight unit 1 arranged on the liquid crystal panel or the back surface thereof come into contact with the support portion 21, but also at such areas where the liquid crystal panel 3 comes into contact with the reinforcing plate 12 as may be necessary. In this case, although not shown, the friction reduction means is applied to the periphery of the back surface of the liquid crystal panel 3 or the periphery of the upper surface of the reinforcing plate 12.

Note that although the description of the first embodiment provides for the use of the friction reduction means as the creak reduction means as an example, it may also serve as the mutual displacement absorbing means consisting of a soft metal sheet and an insulative sheet, where the sheet itself is deformed by which the difference in thermal expansion can be absorbed.

Second Embodiment

In the case of the large-sized liquid crystal display device, the central portion of the back surface reflector 11, the reinforcing plate 12, and the diffusion plate 13 are easily bent due to their own weight. To prevent this, protrusions referred to as spacer pins having a conical shape, for example, are often provided in the central portion or the like of the backlight unit 1 and used to support the optical sheet such as the reinforcing plate 12 and the diffusion plate 13, or in another case, reinforcing members are provided on the back surface reflector 11. Providing spacer pins is very effective in enabling the large-sized liquid crystal display device to carry out stable display. In addition, providing the reinforcing members on the back surface reflector 11 is also a very effective way of reducing the weight of the large-sized liquid crystal display device while maintaining its strength because a plate made of thin sheet metal can be used as the back surface reflector 11.

However, when such spacer pins and reinforcing members are used, unpleasant creaks could occur at the surface area where the spacer pins come into contact with the optical sheet such as the reinforcing plate 12 and the diffusion plate 13 and the attaching surface between the back surface reflector 11 and the reinforcing members.

Consequently, a liquid crystal display device of the second embodiment was fabricated in which the friction reduction means serving as the creak reduction means was applied to the surface area where the spacer pins comes into contact with the optical sheet such as the reinforcing plate 12 and the diffusion plate 13, and the mutual displacement absorbing means serving as the creak reduction means was also provided on the attaching surface between the back surface reflector 11 and the reinforcing members.

Figure 6:
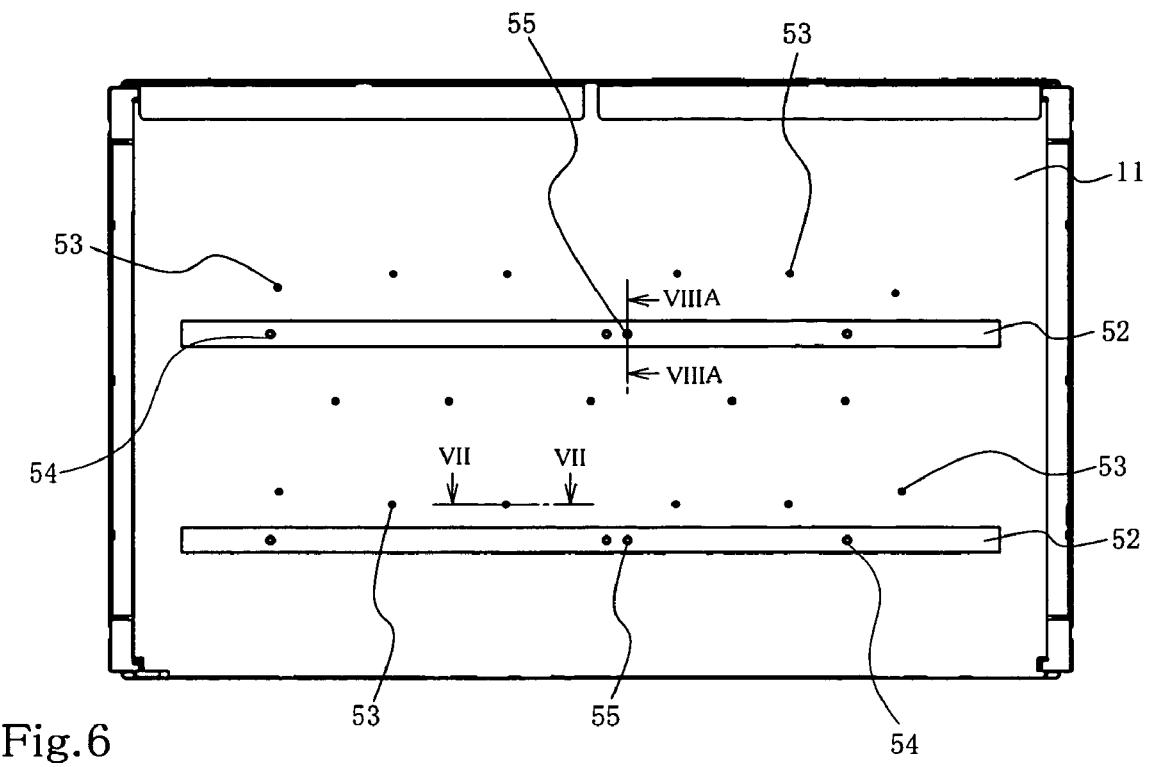
FIG. 6 is a plane view of the back surface reflector of a liquid crystal display device according to the second embodiment of the present invention, viewed from the rear.
Figure 7:
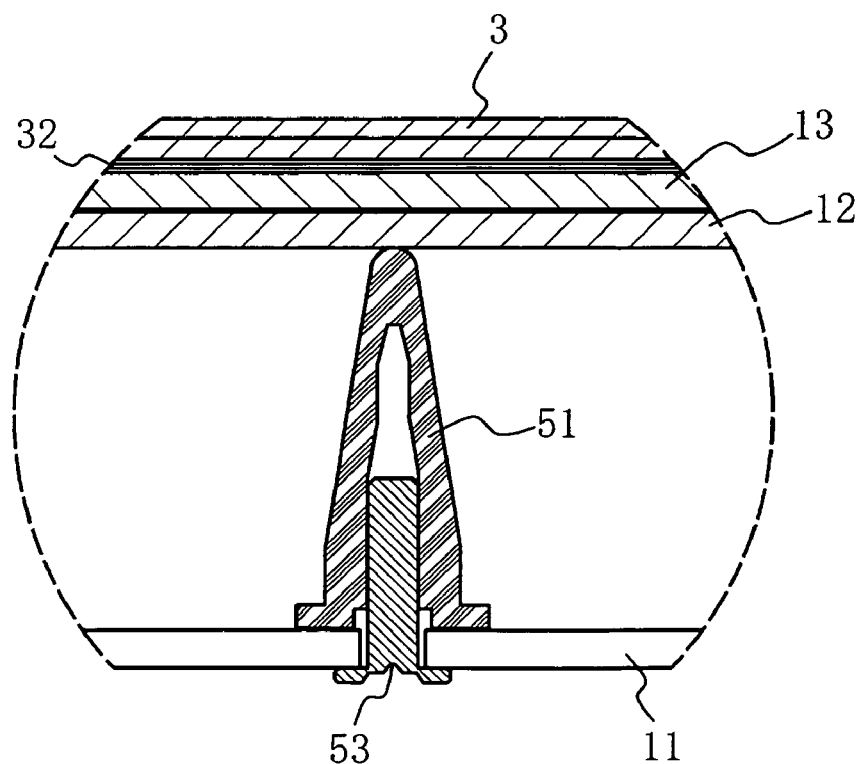
FIG. 7 is an enlarged sectional view at VII-VII of the liquid crystal display device referred to in FIG. 6.
Figure 8A:
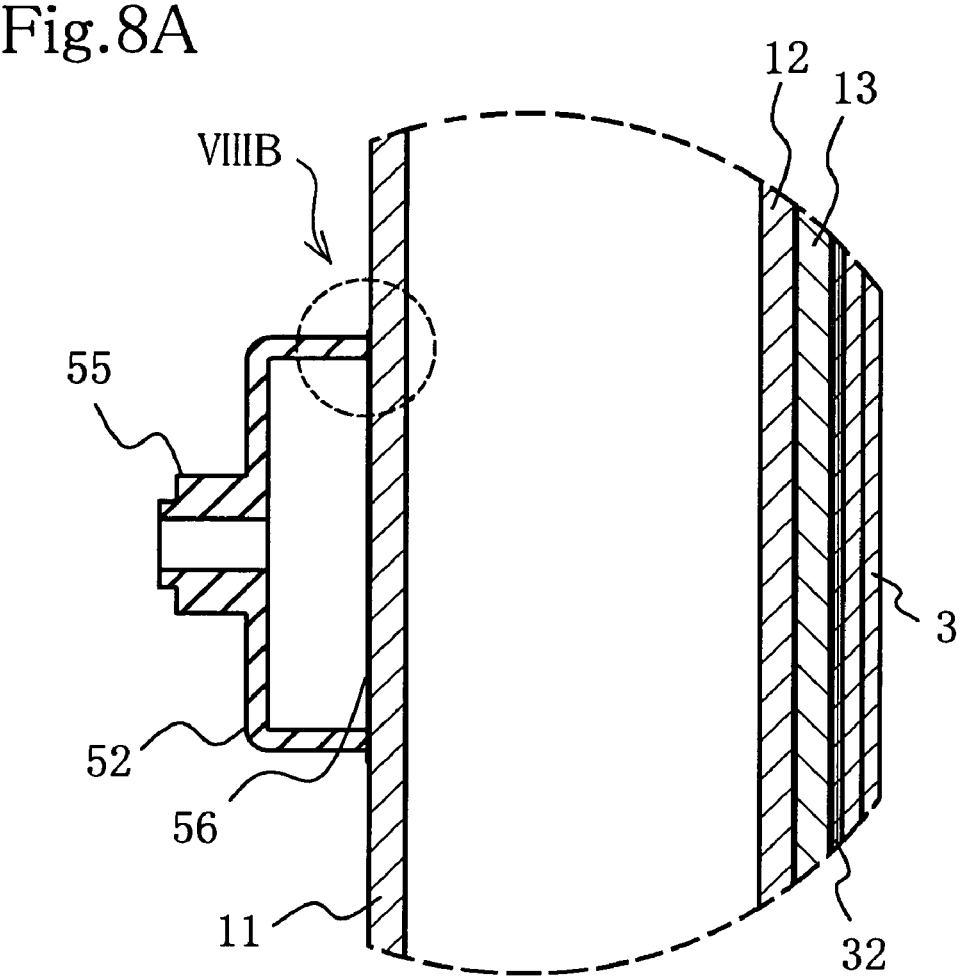
FIG. 8A is an enlarged sectional view at VIIIA-VIIIA of the liquid crystal display device referred to in FIG. 6.
Figure 8B:
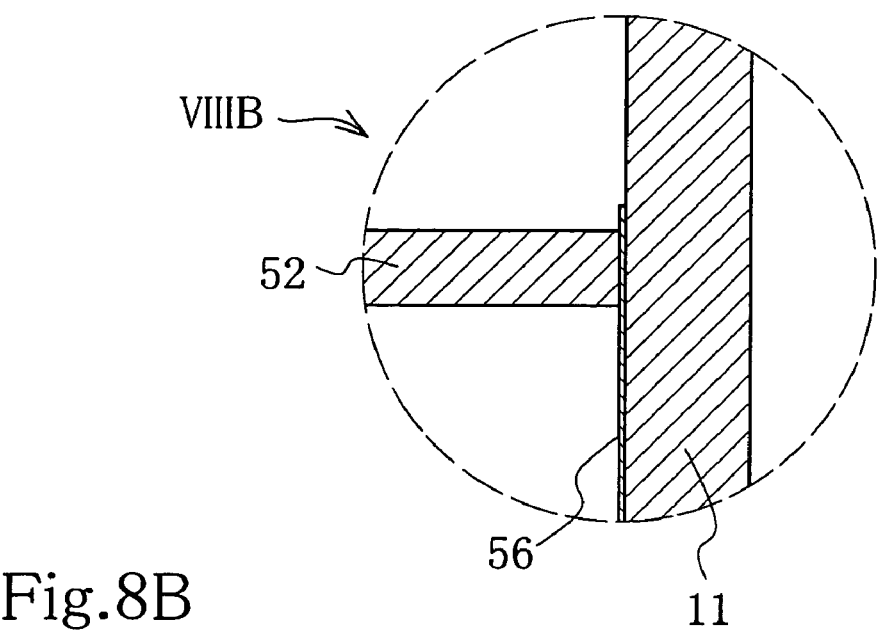
FIG. 8B is an enlarged view of the area marked as VIIIB in FIG. 8A.
Figure 9:
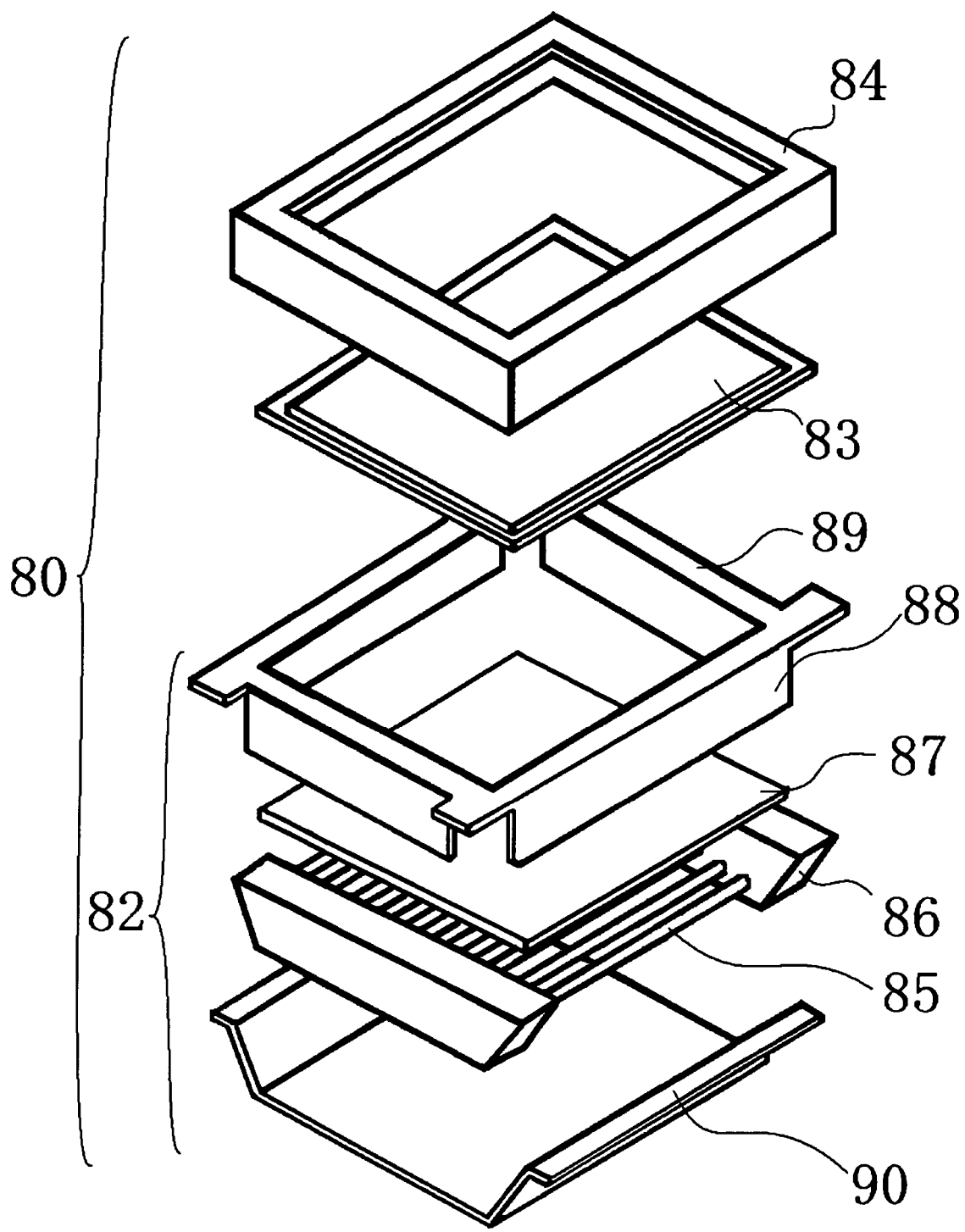
FIG. 9 is an exploded perspective view showing an example of the structure of a conventional liquid crystal display device.

The constitution of the liquid crystal display device of the second embodiment will hereafter be described with reference to FIGS. 6 to 8. Note that FIG. 6 is the plane view of the back surface reflector of the liquid crystal display device according to the second embodiment, viewed from the rear, while FIG. 7 is the enlarged sectional view at VII-VII of the plane view of the liquid crystal display device illustrated in FIG. 6. FIG. 8A is the enlarged sectional view of VIIIA-VIIIA as marked in FIG. 6, while FIG. 8B is the enlarged view of the area marked as VIIIB in FIG. 8A. The attaching means for the liquid crystal panel, the reinforcing plate, the diffusion plate and the like, the tubular light sources, and the like of the liquid crystal display device 10 of the first embodiment similarly apply to corresponding members in the liquid crystal display device of the second embodiment although they are not shown in FIGS. 6 to 8. Accordingly, the same reference numerals used to identify such components have been assigned to corresponding components of the liquid crystal display device of the second embodiment but they will no longer be described in detail.

In FIGS. 6 to 8, a plurality of spacer pins 51 are attached on the central portion of the inner surface of the back surface reflector 11, and two reinforcing members 52 are arranged on the central portion of the outer surface of the back surface reflector 11 parallel to its longer side.

As shown in FIG. 7, the spacer pins 51 are of an elongated hollow conical shape whose one end is open, and 17 pieces of these pins which are approximately 20 mm tall, with a bottom diameter of approximately 10 mm, and an upper surface diameter of approximately 2 mm are used for a 40-inch type liquid crystal display panel of the second embodiment. The open ends of the pins are positioned on the inner surface of the back surface reflector 11 by attaching screws 53, while the upper surface of the pins are made to come into contact with the reinforcing plate 12, as to lend support to the diffusion plate 13, a polarization film 32, the liquid crystal display panel 3 and the like provided on the reinforcing plate 12. Having completed such arrangement, silicon oil is applied as the friction reduction means on the upper surface of the spacer pins 51 to reduce friction between the spacer pins and the reinforcing plate 12 and prevent the generation of noise.

Further, the two reinforcing members 52 are made of a thin material of any of SECC (Electrolytic zinc-plated steel sheet, JIS), SGCC (Hot dip zinc-plated steel sheet, JIS), stainless steel, or iron sheet, for example, with a horseshoe shaped section to enhance strength, and are attached to the back surface reflector 11 by fastening screws 54 such that the opening of the reinforcing members 52 comes into contact with the outer surface of the back surface reflector 11. In FIG. 8A, note that protruding openings 55 are provided on the reinforcing members 52 for fastening screws to affix a circuit board (not shown) and the like.

Then, as shown in FIG. 8B, mutual displacement absorbing means 56 made of aluminum tape, for example, serving as creak reduction means is arranged between the reinforcing members 52 and the back surface reflector 11. Since aluminum tape is conductive and flexible, the tape itself is deformed in the process of absorbing the thermal expansion difference between the reinforcing members 52 and the back surface reflector 11, so that noise does not occur while electric connection between them is made. With this constitution, since grounding can be made via the two reinforcing members 52 and the back surface reflector 11 when a control board or the like for driving the liquid crystal display panel, for example, is fixed on the two reinforcing members 52, electro magnetic interference (EMI) can likewise be reduced.

Note that flexible sheet metal such as a copper foil tape can also be utilized to serve as the mutual displacement absorbing means 56, while an insulative elastic sheet can be used if there is no need to attach the circuit board or the like to the reinforcing members 52.

Although the above-described embodiments have been described with reference to the drawings and exemplify the technical ideas of the present invention, they are not intended to restrict the application thereof to the liquid crystal display device, since the invention is also applicable for any other device that may be included within the scope of the claims.

What is claimed is:

1. A liquid crystal display device, comprising:
    a liquid crystal panel; and
    a direct type backlight unit which has a plurality of tubular light sources,
    wherein the backlight unit is provided with light sources and a frame housing the light sources, and wherein a member is located between the liquid crystal panel and the frame, which member resides above the light sources, the member being selected from the group consisting of a reinforcing plate, an optical sheet, a diffusion plate and a prism sheet; and
    wherein the frame supports a peripheral area of the member and a friction reduction means for reducing friction between the frame and a face of the member is provided on a surface of the frame which supports the member,
    the friction reduction means comprising a protruding fin.

2. The liquid crystal display device according to claim 1, wherein the member is an optical sheet, which is supported by a step formed on the frame.

3. The liquid crystal display device according to claim 1, wherein the member is a reinforcing plate which is supported by a step formed on the frame, and an optical sheet is made to reside above the reinforcing plate.

* * * * *